(12) United States Patent
Huber et al.

(10) Patent No.: US 6,719,004 B2
(45) Date of Patent: Apr. 13, 2004

(54) CHECK VALVE FLOOR DRAIN

(76) Inventors: Donald G. Huber, P.O. Box 64160, Tacoma, WA (US) 98464; Allen I. Stakset, 11107- 18th Ave. East, Tacoma, WA (US) 98445

( * ) Notice: Subject to any disclaimer, the term of this patent is extended or adjusted under 35 U.S.C. 154(b) by 0 days.

(21) Appl. No.: 10/206,725

(22) Filed: Jul. 25, 2002

(65) Prior Publication Data

US 2002/0189675 A1 Dec. 19, 2002

Related U.S. Application Data

(63) Continuation-in-part of application No. PCT/US01/19651, filed on Jun. 19, 2001.

(51) Int. Cl.$^7$ .............................. E03C 1/12; F16K 15/14
(52) U.S. Cl. .................. 137/362; 137/847; 137/850
(58) Field of Search ................... 137/846, 847, 137/849, 850, 362

(56) References Cited

U.S. PATENT DOCUMENTS

| | | | |
|---|---|---|---|
| 155,669 A | 10/1874 | Painter | |
| 171,817 A * | 1/1876 | Kahl | 137/847 |
| 194,329 A | 8/1877 | Buhrer | |
| 803,979 A | 11/1905 | Bonnell | |
| 1,137,516 A | 4/1915 | Moon | |
| 1,771,770 A | 7/1930 | Bruno | |
| 1,867,478 A | 7/1932 | Stelzner | |
| 2,211,212 A | 8/1940 | Langdon | 277/60 |
| 2,371,449 A * | 3/1945 | Langdon | 137/847 |
| 2,579,855 A | 12/1951 | Pockel et al | 251/119 |
| 2,598,002 A | 5/1952 | Langdon | |
| 2,655,178 A | 10/1953 | Sarosdy | 137/614.2 |
| 2,675,823 A | 4/1954 | Langdon | 137/218 |
| 2,725,075 A | 11/1955 | Irgens | 137/512.1 |
| 2,777,464 A | 1/1957 | Mosely | 137/516.13 |
| 2,913,000 A | 11/1959 | Roberts | 137/525 |
| 2,936,779 A | 5/1960 | Kindred | 137/525 |
| 2,997,050 A | 8/1961 | Ferguson | 137/63 |
| 3,047,013 A * | 7/1962 | Baumbach | 137/849 |
| 3,059,637 A | 10/1962 | Senne | 128/141 |
| 3,107,687 A | 10/1963 | Howe | 137/362 |
| 3,118,468 A * | 1/1964 | Bochan | 137/846 |
| 3,228,418 A | 1/1966 | Rosback et al. | 137/516.17 |
| 3,268,018 A | 8/1966 | Neilson | 175/318 |
| 3,335,741 A | 8/1967 | Liljendahl | 137/247.15 |
| 3,354,903 A | 11/1967 | Caruso | 137/512.15 |
| 3,463,189 A | 8/1969 | Fitzpatrick | 137/614.2 |
| 3,519,012 A | 7/1970 | Van Patten | 137/102 |
| 3,542,057 A | 11/1970 | Staiano | 137/328 |
| 3,605,132 A | 9/1971 | Lineback | 4/211 |
| 3,707,986 A | 1/1973 | Breen | 137/525.1 |
| 3,730,218 A | 5/1973 | Rydberg | 137/525 |
| 3,911,949 A | 10/1975 | Hilden et al. | 137/525 |

(List continued on next page.)

Primary Examiner—A. Michael Chambers
(74) Attorney, Agent, or Firm—Garrison & Associates PS

(57) ABSTRACT

A method and apparatus for admitting liquid from a draining surface into a drain conduit and for preventing discharge of waste gas from the drain conduit into the atmosphere in response to a higher pressure in the drain conduit than at the draining surface. The method and apparatus typically are for use draining floors, basements, roofs, countertops, exterior paved areas, and surfaces draining into line that could discharge waste gas back into the environment. The invention provides floor drain assemblies and check valves with good drainage performance with out the use of P or U-traps, and is particularly well suited for use when drainage occurs irregularly. Floor drains according to the invention comprise check valves adapted for disposition within floor drains, the check valves generally comprising spring-loaded stops, elastic diaphragms, or sheath valves. Check valves according to the invention are preferably installable in existing drain structures, and are easily removable.

13 Claims, 8 Drawing Sheets

U.S. PATENT DOCUMENTS

| | | | |
|---|---|---|---|
| 3,990,439 A | 11/1976 | Klinger | 128/142.4 |
| 4,054,152 A | 10/1977 | Ito et al. | 137/512 |
| 4,098,287 A * | 7/1978 | Baumbach | 137/362 |
| 4,163,509 A | 8/1979 | Amneus | 222/95 |
| 4,222,407 A | 9/1980 | Ruschke et al. | 137/512.15 |
| 4,232,704 A | 11/1980 | Becker et al. | 4/287 |
| 4,594,739 A * | 6/1986 | Watts et al. | 4/287 |
| 4,610,246 A | 9/1986 | Delphia | 128/201.11 |
| 4,712,574 A | 12/1987 | Perrott | 137/217 |
| 4,729,401 A | 3/1988 | Raines | 137/512 |
| 4,762,149 A | 8/1988 | Pickl, Jr. | 137/843 |
| 4,838,262 A | 6/1989 | Katz | 128/205.24 |
| 4,870,992 A * | 10/1989 | Irwin et al. | 137/846 |
| 5,005,603 A | 4/1991 | Amundson et al. | 137/192 |
| 5,014,739 A | 5/1991 | Csaszar | 137/512.15 |
| 5,277,171 A | 1/1994 | Lannes | 126/362 |
| 5,330,437 A | 7/1994 | Durman | 604/167 |
| 5,419,359 A | 5/1995 | Kor | 137/247.15 |
| 5,601,112 A | 2/1997 | Sekiya et al. | 137/512.15 |
| 5,606,995 A * | 3/1997 | Raftis | 137/846 |
| 5,727,593 A | 3/1998 | Duer | 137/846 |
| 6,273,124 B1 | 8/2001 | Huber et al. | 137/362 |
| 6,367,505 B1 | 4/2002 | Raftis et al. | 137/846 |

\* cited by examiner

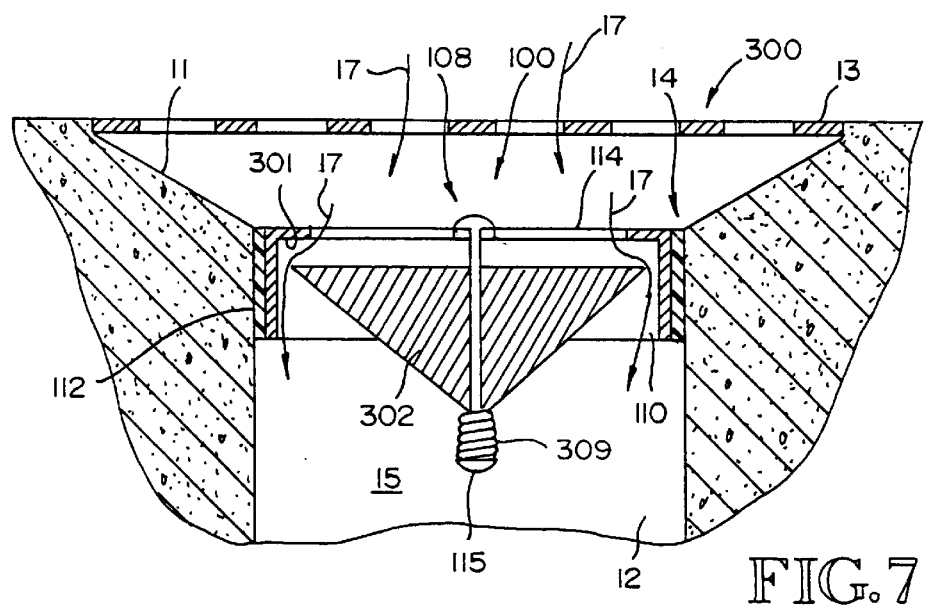
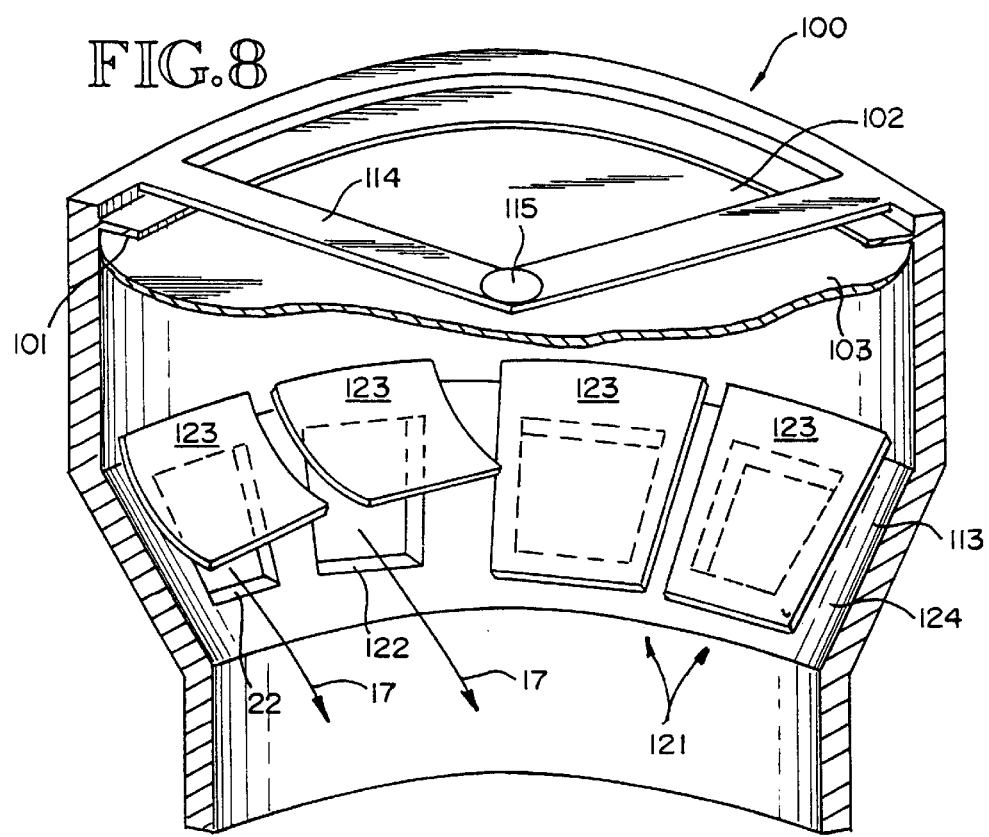

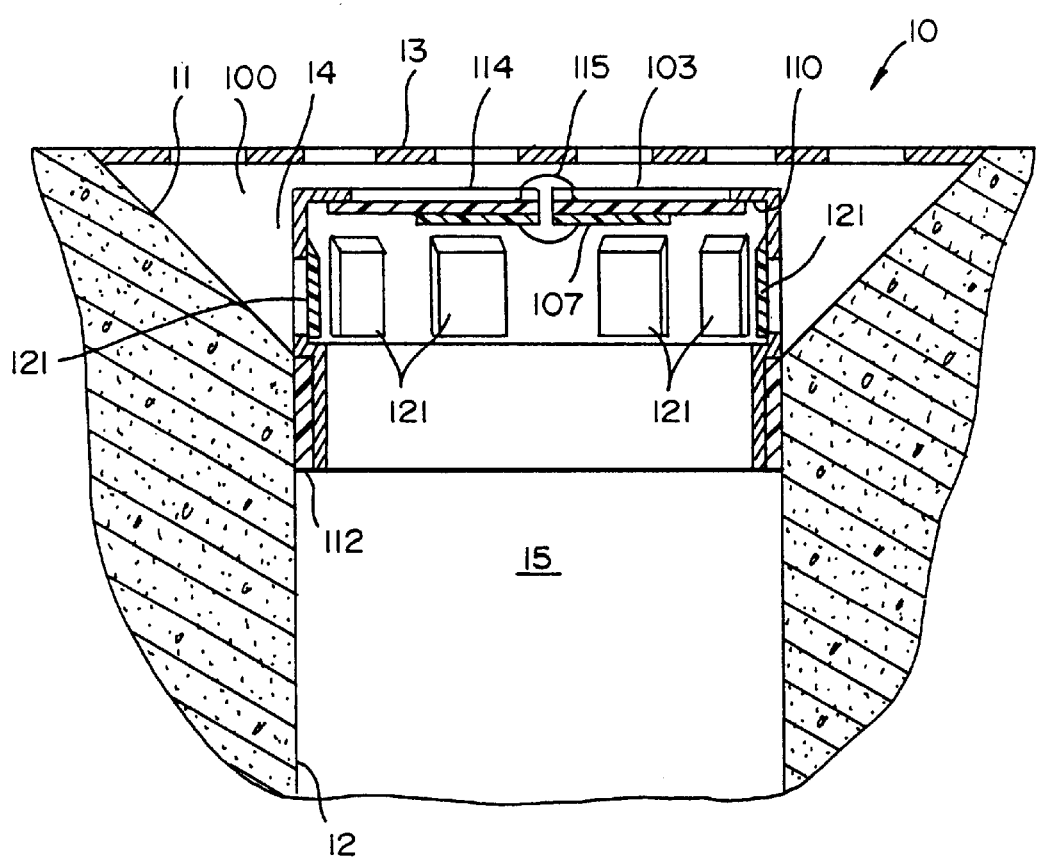

CHECK VALVE FLOOR DRAIN

CROSS-REFERENCE TO RELATED APPLICATION

This application is a continuation-in-part of and claims priority based on PCT application No. PCT/US01/19651, filed Jun. 19, 2001, and entitled CHECK VALVE FLOOR DRAIN.

TECHNICAL FIELD

The invention relates to drains for building floors, basements, exterior paved areas, and the like. The invention provides floor drain assemblies and check valves providing improved drainage performance and minimized backflow, particularly where drainage is an irregular occurrence.

BACKGROUND OF THE INVENTION

U-shaped or "gooseneck" traps have long been used in the plumbing industry to prevent backflow of harmful or annoying sewer or pipe gasses into buildings while permitting drainage of unwanted water from floors and other horizontal surfaces. Such traps operate by leaving a small quantity of fluid within the lower portion of a U-shaped trap section to act as a gas barrier. In many applications, however, particularly where access is difficult or where drainage is infrequent, it is disadvantageous to use such drains. Fluid may evaporate from the trap, permitting free flow of obnoxious gases through the drain; insects may breed in the fluid, or in some instances the fluids may harden so as to actually block or restrict flow through the drain. Such conventional drains are also relatively difficult and expensive to install. In addition to floor drain applications, these problems are also common to other areas of fluid control, wherever fluid drainage is an occasional problem.

One solution to these problems has been the use of trap primers, which operate to ensure that a minimum level of fluid is left in the drain to act as a trap for gasses, which accumulate within drains. Trap primers are usually difficult and expensive to install, and require maintenance and constant monitoring to ensure their functionality.

Outside the floor drain environment, the use of check valves has been suggested. As demonstrated herein, check valves can be efficient both in facilitating draining operations and in trapping drain-pipe gasses and preventing backflow. Heretofore, however, no one has suggested placing simple and efficient check valves in floor drains, either alone or in combination or in series with other types of valves.

DISCLOSURE OF THE INVENTION

The invention provides improved floor drains of unprecedented simplicity and reliability. In one aspect, the invention provides a check valve for a floor drain, the check valve being adapted for disposition within a floor drain or a drain basin and comprising a stop adapted for sealing engagement of a drain sealing surface located proximate an inlet to said floor drain, and further comprising means adapted to urge the stop into sealing engagement with the drain sealing surface. The means for urging the stop into sealing engagement with the drain sealing surface is adapted to permit disengagement of the stop from the sealing surface as a fluid such as water enters said drain, so as to permit drainage of the fluid through the drain is permitted, while urging the stop back into contact with the sealing surface so that backflow of gasses from within said drain is prevented after the fluid has drained. Improved drain and valve assemblies provide redundant gas-trap and backflow prevention protection through the simple, economical, and efficient application of check valves. Redundant layers of check valves are installed in series to permit one-direction fluid flow and vacuum relief in drains.

In one aspect, the invention provides a drain assembly for use in the drainage of drain surfaces such as building and basement floors, exterior paved areas, swimming pools, and the like. The most common application of this aspect of the invention is in the drainage of water from flooded areas, with the water flowing downward under the influence of gravity or some other driving force. Most often, this means that the fluid drains substantially vertically under gravitational influence. An assembly according to this aspect of the invention comprises a drain basin having an inlet and an outlet, with the outlet being adapted for the attachment of a drain conduit, and at least one check valve disposed within the drain basin. In an alternative embodiment, at least two check valves can be placed in series to form a set, preferably in a substantially vertical orientation, so that a chamber is formed between the valves. Two or more sets can be used in parallel, or in series if desired, or some combination thereof. The check valves are adapted, generally by a combination of their substantially vertical series orientation and by the use of valves having suitable design opening or actuating pressures, to permit drainage of fluids through the drain inlet without substantial restriction, and to prevent backflow of gasses from the drain conduit through the chamber to the inlet. Preferably, valves are selected with opening and/or actuating pressures suitable for allowing gasses, for example air, to flow through the drain inlet and the chamber to relieve any vacuum formed within the drain conduit. The check valves are supported in a removable framework or other structure so that the valves may be removed from the drain for cleaning, repair, replacement, or other maintenance.

In another aspect, the invention provides a valve assembly for use with drains for draining drain surfaces. A valve assembly according to this aspect of the invention comprises a preferably removable support structure adapted for disposition, preferably by insertion, within a drain basin installed in a floor or other drain surface. The support structure is adapted to support either a single check valve, or a plurality of check valves so as to form at least one chamber between serial individual valves or sets of valves, and to permit drainage through the drain in the manner described herein.

Check valves used with the invention are of various types. For many applications, and in particular where the drain is intended to facilitate drainage of water from floors and the like, flapper valves having flexible diaphragms adapted to engage a circumferential seat, and optionally comprising backing plates to support the diaphragm, and spring-loaded or spring-biased valves, are preferred. The selection of suitable check valves for any given drainage application will not trouble the designer of ordinary skill in the pertinent art.

Other preferred embodiments of this check valve aspect of the invention comprise stops incorporating "flapper" diaphragms made of elastic material, such as natural or synthetic rubbers, or other polymers. The diaphragm in such embodiments has sufficient flexibility to flex under pressure or other action of liquid entering the drain in order to allow the liquid to drain, and to return to a substantially unflexed condition in which sealing engagement of the drain sealing surface by the diaphragm is restored following drainage of said liquid. In such embodiments, as may be seen, the elasticity of the diaphragm acts as the means for urging the diaphragm into sealing contact with the drain sealing surface. A particular advantage of such embodiments of the invention is that the elastic diaphragm may be relatively easily, through well known liquid static and dynamic principles, and through well known principles of structural mechanics, be adapted to flex under the action of a preselected head pressure when liquid is present within the drain. That is, the geometry, and therefore the stiffness, of a diaphragm made of any given elastic material may be selected to ensure that the valve will open when a desired amount of water is present in the drain. As will be readily understood by those of ordinary skill in the art, once the suggestion has been made, this purpose may be accomplished either by selecting an appropriate uniform thickness for the diaphragm or by tailoring the thickness to provide a non-uniform thickness having any of a wide variety of desired flexure or bending characteristics. Another way of controlling flexure in the diaphragm, as will be well understood by those of ordinary skill in the art, is to provide the elastic diaphragm with a back plate which serves to stiffen or otherwise support at least a portion of the diaphragm. In such cases portions of the diaphragm supported by the back plate will have a generally increased stiffness, as compared to non-backed portions of the diaphragm.

In other preferred embodiments of the invention the check valve is spring-biased, such that the means for urging the stop into contact with the drain sealing surfaces comprises a spring. As will be readily apparent to those having ordinary skill in the art, in such embodiments it is a relatively straightforward matter, once the idea has been suggested, to select or adapt a spring having an appropriate thickness for permitting disengagement of the stop from the sealing surface when a selected head pressure had been reached inside the drain.

Yet another embodiment of a drain assembly according to the invention comprises a collapsible, flexible, one-way valve, referred to herein as a sheath valve. The sheath valve can be disposed within the interior of the existing drain conduit or a drain basin adapted for attachment to the existing drain conduit. The drain basin comprises an inlet portion, which is preferably bowl-shaped, and which is adapted to receive fluid entering the basin. The sheath valve also comprises an outlet portion having at least one substantially rigid, generally axially oriented longitudinal member, which may be co-molded or otherwise integrally formed, or may be assembled of separate and distinct parts, and a generally axially oriented flexible portion adapted to collapse against the rigid peripheral portion. The substantially rigid and flexible portions form a conduit adapted to transfer fluid from the drain to the drain conduit, via the inlet portion. By collapsing against the rigid portion, as it is biased to do, the flexible portion acts to prevent entry of gasses to the outlet portion of the valve when a pressure within the inlet portion is less than or equal to (that is, not greater than) the pressure outside the outlet portion. When fluid is introduced to the inlet of the sheath valve, the rigid and flexible portions separate under pressure from the fluid, opening the valve so as to allow drainage of the fluid through the valve.

In another variation drain assemblies according to the invention sheath valves are formed from a flexible elastomeric material such that the sheath valve is entirely collapsible. The sheath valve comprises an inlet portion adapted to receive a fluid, and an outlet portion. In this variation the outlet portion comprises no rigid walls, because the elastomeric material has memory properties that allow the sheath valve to open when fluid is passing through the valve and then return to its initial shape when fluid is no longer flowing through the valve. The flexible walls of the outlet portion are biased toward a collapsed position and the valve is opened under pressure from a draining fluid, but entry of gasses to the outlet portion (when a pressure within the inlet portion is not greater than a pressure outside the outlet portion) is prevented. Additionally, a plate may be provided beneath the inlet portion of the valve, the plate being configured so as to deflect the outlet portion of the sheath, and thereby to assist biasing of the sheath walls toward the closed position.

Yet another embodiment of the drain assembly according to the invention comprises a drain basin, a plurality (preferably 3 or more) of substantially vertically arranged support slides, and a valve provided with a plurality (preferably 3 or more; generally in the same number as the support slides) of dependent struts. The drain basin has an interior and is adapted for the attachment thereto of a drain conduit. The substantially vertical support slides are disposed within the interior of the basin and have upper and lower ends, the upper ends being more closely spaced from each other than the lower ends. The valve comprises a plurality of depending struts, the struts being flexible and including distal ends adapted to engage the support slides. The struts are biased, by molding during forming or otherwise, toward positions which are radially extended to an extent to which they provide positive contact in the support slides, so that engagement of the support slides by the struts biases the valve into the closed position, in which the valve seals the drain conduit, but not with so great a force that the introduction of a fluid within the basin will be prevented from causing the valve to move downward, with the struts sliding along the support slides, the valve providing increasing resistance as it is pushed further down, flexing as progressively further as the valve moves downward, breaching the seal between the valve and the drain conduit and allowing drainage of the fluid from the basin. Thus greater pressures of water acting against the valve cause the valve to open more fully, thus increasing drainage flow, but when pressure in the drain basin is reduced, the valve closes.

Yet another embodiment of the drain assembly according to the invention comprises a drain basin attached to a drain conduit and a valve having a plurality of flexible tabs disposed proximate to the drain conduit, the tabs being so sized and shaped as to fit together in a closed configuration in which escape of gas from the drain conduit is prevented when no fluid is present in the basin. The tabs are adapted to deflect under pressure of a fluid draining from said basin, so as to allow drainage, and are biased toward the closed configuration. An optional addition to drain assemblies of this type is a funneling or channeling means adapted to channel fluid entering the basin onto the tabs so as to increase the efficiency of drainage from the basin by increasing the force applied by the draining fluid on the tabs.

An important advantage offered by drain valves according to the invention is that they may be provided either as integral parts of new drain assemblies or with separate housings to that they may be inserted in existing drain structures as retrofits. Thus new drains omitting P- or U-traps may be built, or existing drains having such traps may be provided with the advantages described herein. Likewise, stuck or damaged valves may be easily replaced. In preferred embodiments, the advantage of interchangeability or removability is easily provided by providing the check valve and the biasing means with a housing. Such a housing may be used with or without separate gaskets, etc., for sealing the drain, and may easily be adapted such that the housing itself provides the sealing surface engaged by the stop for sealing of the drain.

Another advantage offered by drain valves according to the invention is that they are readily adapted to a wide variety of drains. For example, they are easily provided in substantially circular section, for use in a standard circular or cylindrical drain pipe or as easily provided with a rectangular or other non-standard section.

Yet another distinct advantage offered by check valves according to the invention is that they are easily installed or used in conjunction with other valves or with existing traps, so as to provide redundant valve structure and the advantages associated therewith. For example, two or more check valves according to the invention may be used together, so that if one becomes jammed or otherwise dysfunctional the other may continue to serve satisfactorily. Likewise, all of the other advantages and improvements described herein, such as the provision of the valve assembly with a housing to permit the valves to be retrofitted or removed for maintenance or replacement, are enjoyed by those embodiments incorporating additional valves.

In addition to the check valves and drain assemblies described herein, as such, it is to be understood that all new and useful devices or components described herein are considered to constitute a part of the invention, claimable in their own right, whether such is stated with particularity herein or not.

BRIEF DESCRIPTION OF THE DRAWINGS

FIG. 7 is a schematic cross-sectional view of an alternative preferred embodiment of a check valve floor drain according to the invention.

FIG. 8 is a schematic perspective partial section view of another alternative preferred embodiment of a check valve floor drain according to the invention.

FIG. 9 is a schematic cross-sectional view of yet another alternative preferred embodiment of a check valve floor drain according to the invention.

BEST MODE OF CARRYING OUT THE INVENTION

Figure 1:
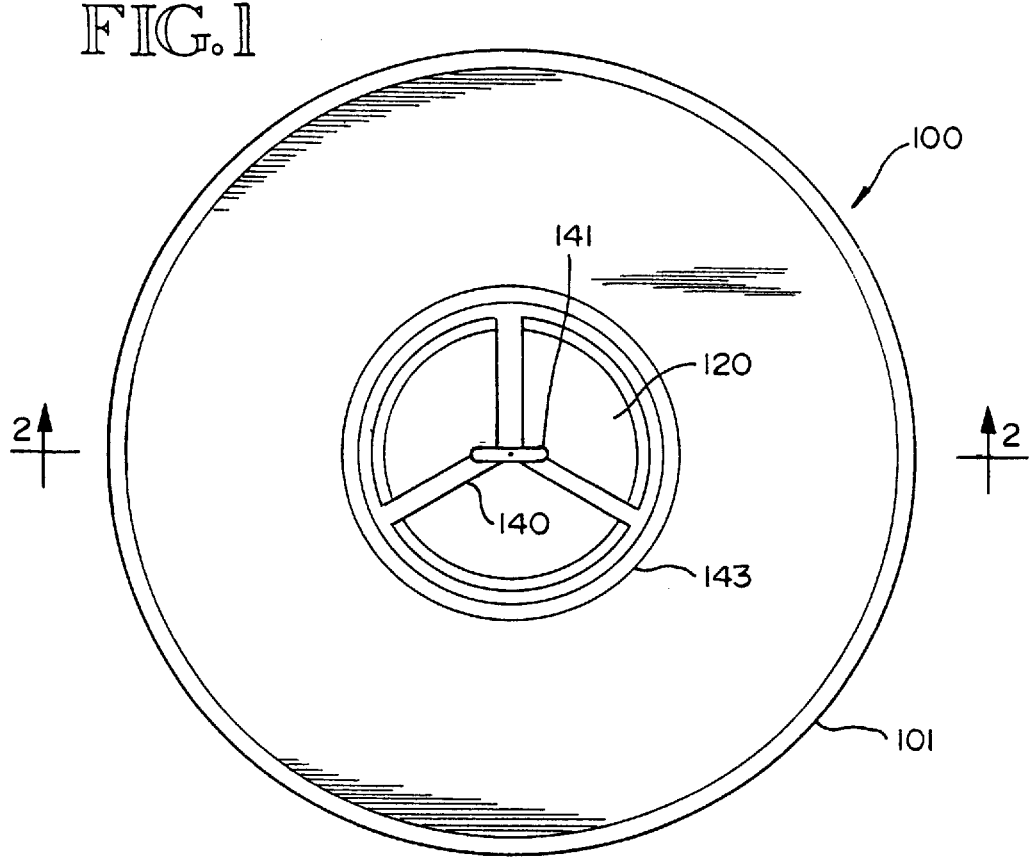
FIG. 1 is a schematic plan view of a preferred embodiment of a drain assembly according to the invention.

Turning now to the drawings, the invention will be described in a preferred embodiment by reference to the numerals of the drawing figures wherein like numbers indicate like parts.

The invention pertains to an apparatus for allowing substantially unrestricted flow from any draining surface while preventing backflow from the drain conduit. References in the specifications and claims to a draining surface, a floor, or the like, mean any surface requiring a drain. The surface being drained could be a roof, a compartment, a sink, a counter top, a floor, an on-grade surface, or a below-grade surface. The surface could be on land or onboard a ship. Specific references to a type surface being drained are to illustrate the invention and not limit its specifications or claims.

Figure 2:
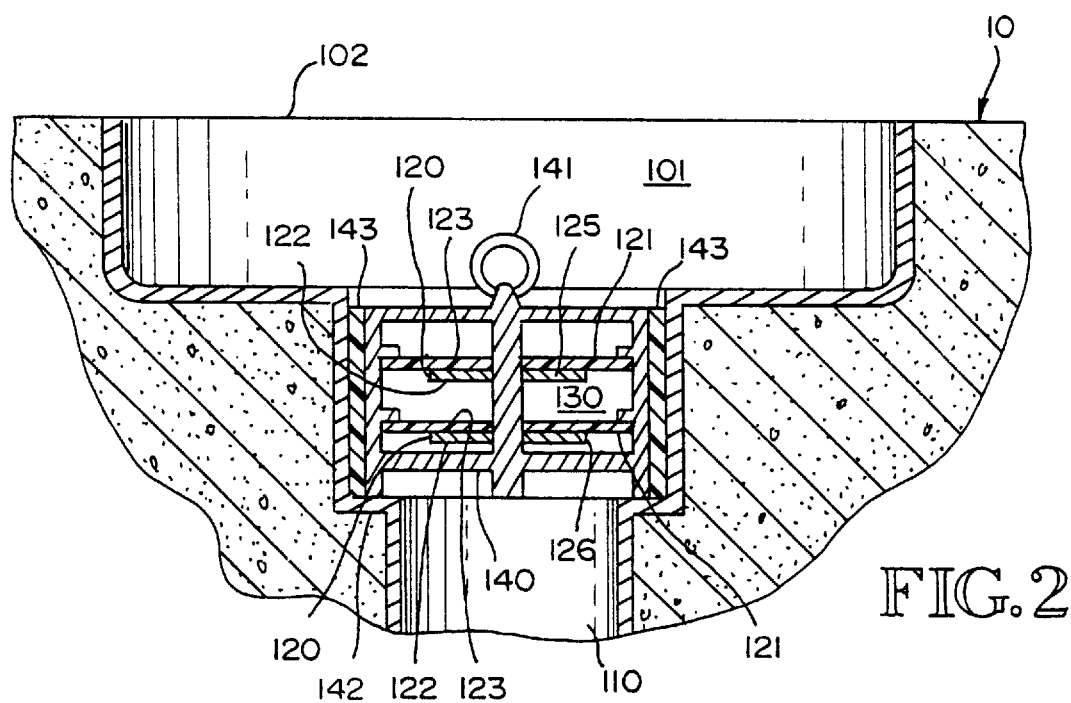
FIG. 2 is a schematic cutaway cross section view of FIG. 1.

FIG. 1 shows a schematic plan view of a preferred embodiment of a drain assembly according to the invention. FIG. 2 shows a schematic cross section view of the drain assembly of FIG. 1. Drain assembly 100 is installed in drain surface 10 so that water or other liquids present on and above the drain surface may drain freely through the drain assembly while gasses present beneath the drain remain trapped in place. Drain assembly 100 comprises drain basin 101, which includes inlet 102 and outlet 103; outlet 103 is attached to drain conduit 110. A check valve assembly 120 is disposed with two check valves 125 and 126 being placed in series so as to form chamber 130 within the drain basin. By virtue of their substantially vertical orientation and their design opening or actuating pressures, check valve assembly 120 is adapted to permit drainage of a liquid from said drain inlet and from said chamber, and to prevent backflow of liquids and/or gasses located within said drain conduit and said chamber to said inlet (as shown by arrows 150 in FIG. 3). Thus the drain assembly acts as both a drain valve and a trap, without the difficulties and expense of installing prior art p-shaped drain traps, and without the necessity and expense for employing a trap primer.

In preferred embodiments of the invention, the substantially vertical orientation of the drain assembly and the selection and use of valves having appropriate actuation or opening pressures, prevents substantial amounts of liquid from building up within chamber the chamber 130 as liquid drains through the assembly.

Preferably, valves are chosen such that their actuation or opening pressures permit air or other liquids to bleed through the drain assembly in order to relieve any vacuum which may build up in the drain conduit.

The use of more than one check valve, with the valves disposed in series and adapted to operate independently of each other, helps to ensure proper functioning of the drain, particularly in case foreign matter intercedes between the check valve itself and any surrounding structure in such manner as to prevent the valve from closing properly or completely. This is particularly useful in ensuring that unwanted gasses remain trapped within the drain conduit, and are not permitted to escape into the atmosphere above the drain; and in preventing back flow through the drain due to floods, etc. This structure also precludes access by insects to liquids in the drain.

A particularly useful optional feature of preferred embodiments of the drain assembly according to the invention is the placement or mounting of the check valves in a removable structure to facilitate cleaning, repair, replacement, or other maintenance of the valves. For example, in the embodiment shown in FIGS. 1 and 2 check valve assembly 120 is mounted in frame 140, which rests upon shoulder 142 in the drain basin. Proper functioning of the drain is aided, in the embodiment shown, by the use of optional sealing ring 143, which is in place between the frame 140 and drain basin 101. Frame 140 is removable from the drain assembly by means of ring 141, or any other structure suitable or mechanism suitable for the purpose.

As indicated above, check valves used with the invention may be of any suitable type. In the embodiment shown in FIGS. 1 and 2 flapper valves 121 are used. Flapper valves 121 comprise flexible valve portions 123 and optional substantially rigid back plates 122. The construction and operation of flapper valves, with or without back plates, is well understood by those having ordinary skill in the art, and will not trouble the designer of systems of the type described herein.

Figure 3:
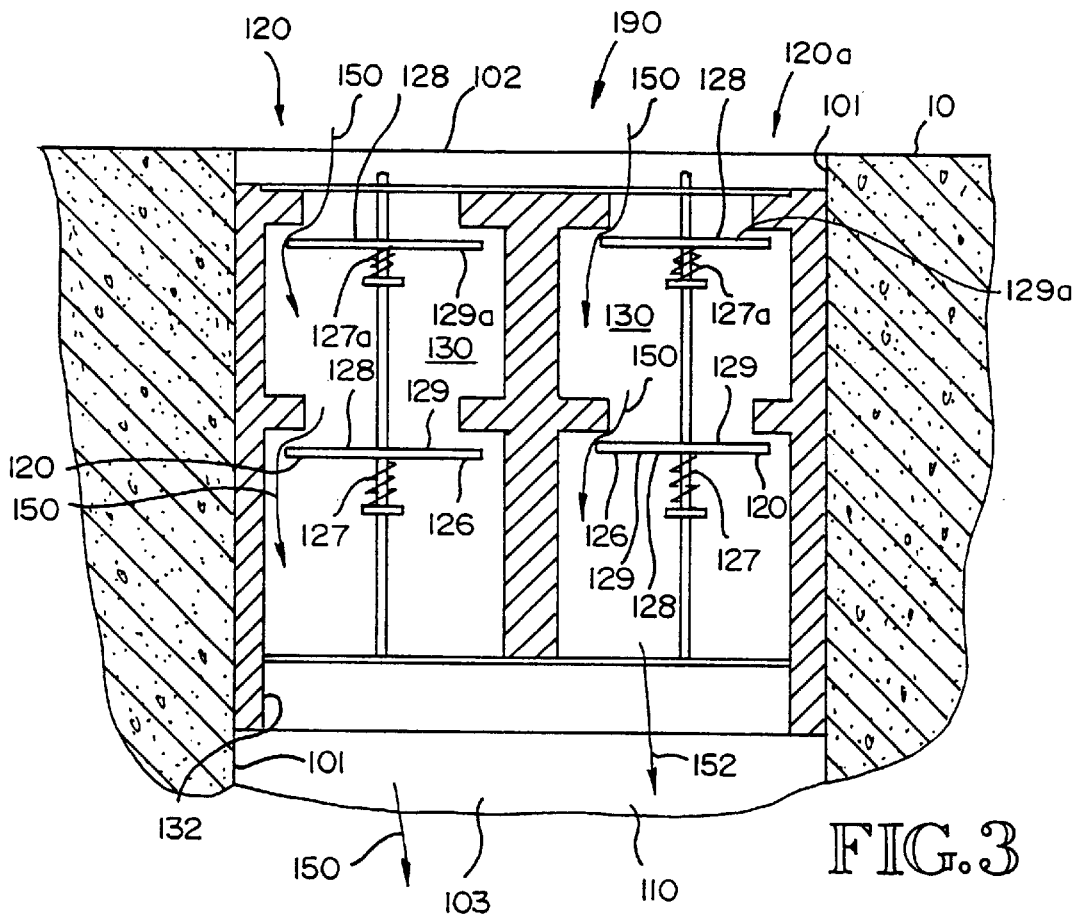
FIG. 3 is a schematic cutaway side view of another preferred embodiment of a valve assembly according to the invention.

FIG. 3 is a schematic cutaway side view of a preferred embodiment of a valve assembly 190 according to the invention. In the embodiment shown, first check valve assembly 120 and second check valve assembly 120a each comprise two spring-biased valves 128 and 128a comprising a valve plate 129 and 129a and a spring 127 and 127a. As will be readily appreciated by the artisan of ordinary skill, valves 128 and 128a open under the action of a relatively higher pressure above the drain and a relatively lower pressure beneath the drain. It is to be noted that valve assembly 190 is inserted directly into drain basin 101, which may consist of, for example, an open end of a drain conduit 103. It should also be noted that chamber 130 may comprise either a single annular (or arbitrarily shaped) chamber or a set of multiple chambers between different groups of check valves.

Figure 4:
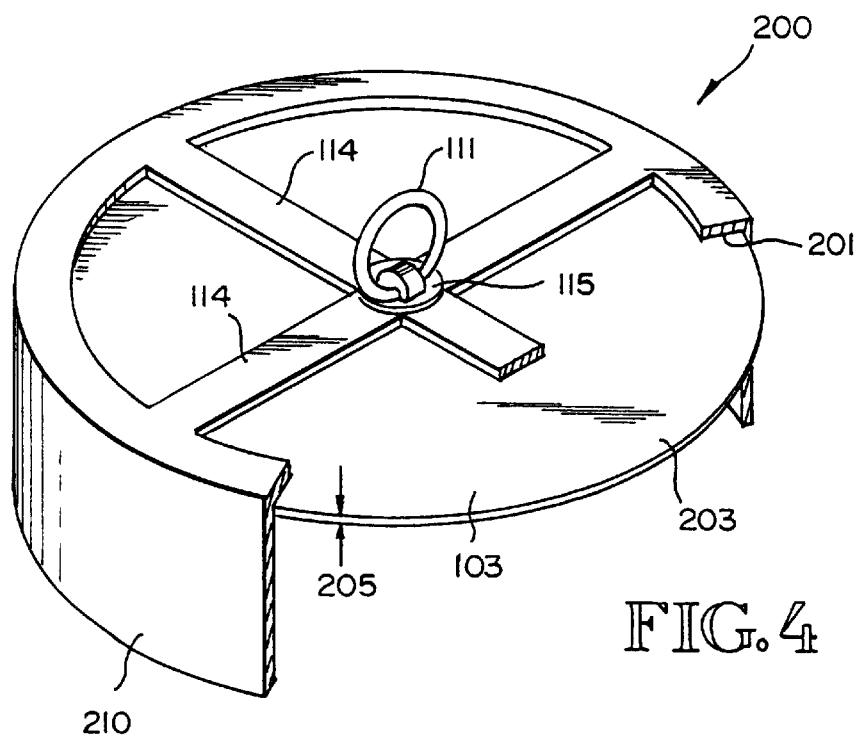
FIG. 4 is a schematic perspective view of another preferred embodiment of a check valve according to the invention.
Figure 5:
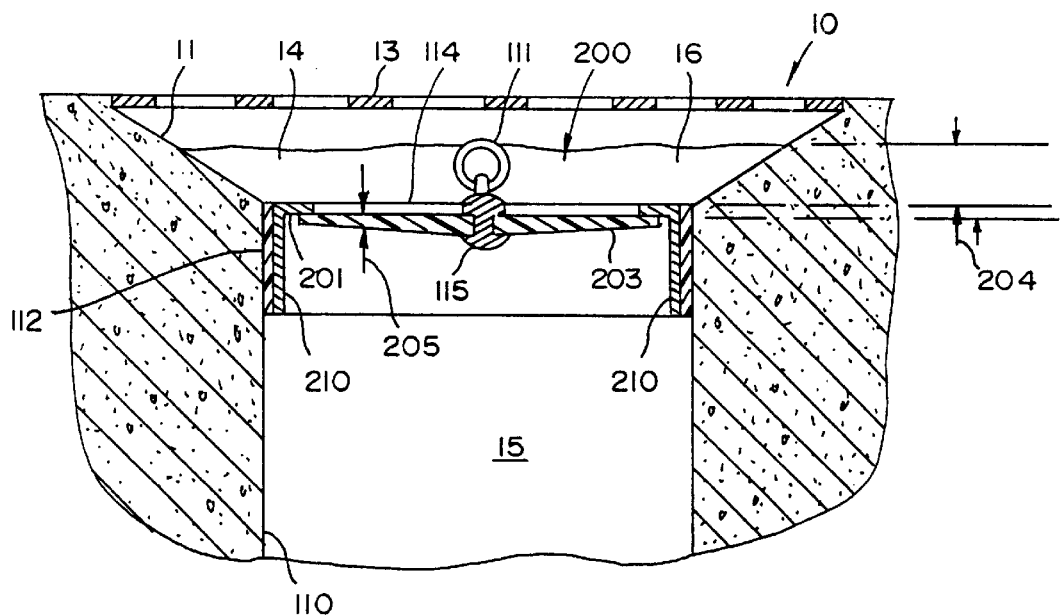
FIG. 5 is a schematic cross-sectional view of the apparatus of FIG. 4.
Figure 6:
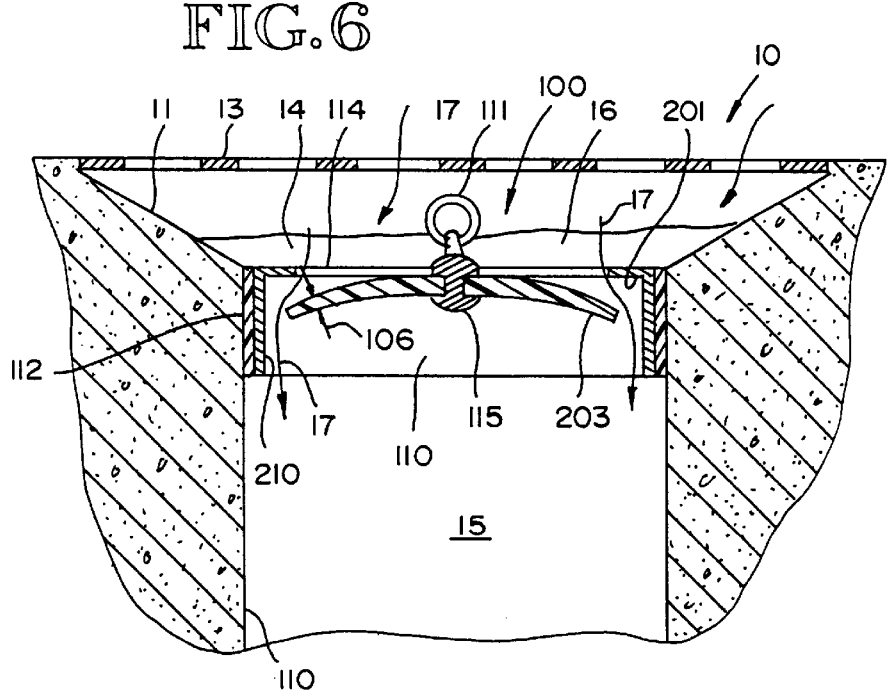
FIG. 6 is a schematic cross-sectional view of the apparatus of FIG. 4 with the diaphragm opened by presence of a liquid.

FIG. 4 is a schematic perspective view of another preferred embodiment of a check valve according to the invention. FIGS. 5 and 6 are schematic cross-sectional views of the device of FIG. 4. Check valve 100 is in place in floor drain 10. Check valve 200 comprises diaphragm 203 adapted for sealing engagement of drain sealing surface 201, which when check valve 100 is installed in a floor drain is located proximate inlet 14 of drain 10, such that when diaphragm 203 is sealingly engaged with sealing surface 201, a liquid tight seal is produced between the drain basin 11 or the exterior of the drain and drain conduit 110 attached to the drain. Thus, gasses trapped within the interior of the drain or within drain conduit 110 are prevented from escaping from the drain.

Most typically, sealing surface 201 is formed by a circumferential rim or other surface disposed about an outlet to the drain conduit, or by a part of a removable housing such as optional housing 210 for check valve 100, which is provided for ease installation or removal. In the embodiment shown in FIGS. 1–3, sealing surface 101 is a part of housing 110, which together with optional gasket 112 serves to form a seal between diaphragm 203 and the wall of drain 110.

In the embodiment shown in FIGS. 1–3, flexible diaphragm 203 is formed to engage sealing surface 201. As shown in FIGS. 1 and 3, diaphragm 203 has sufficient flexibility to flex under action of a liquid (represented by arrows 17) as it enters drain basin 11, and thus to allow drainage of the liquid, and to return substantially to its original, unflexed condition, so that sealing between the diaphragm and the drain sealing surface is restored as the liquid drains. In preferred embodiments of this aspect of the invention diaphragm 203 is adapted to flex under the action of a preselected head pressure within said drain. This may be accomplished in any number of ways, most of which will occur to those of ordinary skill in the art once they have been exposed to the material herein. For example, diaphragm 203 may be made of a suitable uniform thickness such as thickness 205 shown in FIG. 1, or from a variable thickness tailored for any desired change in flow rate with respect to pressure, such as thickness 206 in FIGS. 2 and 3. The structural properties of diaphragms being relatively well known, and hydrostatic pressure being given by the equation $$sp = \rho g h,$$

where p=pressure, $\rho$=the specific gravity of the liquid to be drained through the valve, g=the local acceleration due to gravity or other body force acting on the liquid, and h=head, as shown by reference 204 in FIG. 5. Thus, is it a straightforward matter for one having ordinary skill in the art, once armed with this disclosure, to select an appropriate head 204 and to design a diaphragm 203 which will deflect suitably in the presence of that head and permit the liquid to drain into the conduit 110.

An optional alternative means for tailoring the deflection of diaphragm 203 under any given head of water or for otherwise increasing or affecting the stiffness of the plate is through the use of a back plate on one side of the diaphragm. Most commonly such a plate will be placed on the drain side of the diaphragm, as shown in FIG. 9, but the effect of water accumulating in the drain basin on the diaphragm may be affected as well by placing the back plate before the diaphragm. Typically a back plate such as plate 107 in FIG. 9 will support at least a portion of the diaphragm, and depending upon the stiffness of the diaphragm and the plate may support the entire diaphragm.

In alternative preferred embodiments of this aspect of the invention the check valve comprises a spring or extendable mounting cord adapted to urge the stop into sealing engagement with the drain sealing surface. Such an embodiment is shown in FIG. 7. Check valve 300 comprises stop 302 and spring 309, which serves to bias stop 302 into sealing contact with sealing surface 301. As shown in FIG. 7, spring 309 is compressed under action of liquid in the drain, the motion of which is represented by arrows 17, so as to allow stop 302 to disengage from sealing surface 301, and therefore to allow the liquid to drain. As will appear to those of ordinary skill in the art, it is a relatively simple matter to select a spring 309 having an appropriate stiffness to allow stop 302 to disengage the sealing surface when a desired level of liquid has accumulated in the drain. In general, it has been observed that under some circumstances the selection and fabrication of a spring having just the desired stiffness may be more difficult than making a flexible diaphragm of the type described herein having an appropriate flexibility and elasticity.

One advantage of providing check valves according to the invention with on optional housing such as housing 110 or 210 in the Figures is that the housing may be provided with convenient means for installing and removing the check valve in a floor drain. For example, ring 111 in FIGS. 4–6 permits removal of the check valve. In addition to providing an attachment for the installation and removal means housing 110 or 120 provides structural support for stop 302 or diaphragm and the biasing means, and optionally a drain sealing surface 201. In embodiments of the invention comprising flexible diaphragms 203, the housing may include cross members 114 or other structure to provide direct attachment for the diaphragm, as by means of fastener 115, which may consist of a rivet, nut and bolt, or other mechanical fastener. Alternatively, the diaphragm may be attached with adhesive or with a bonding process, or integrally molded. Similarly, diaphragm 203 and spring 309 may be supported by means of cross members 114 and fasteners 115 or by any other suitable method.

It may be seen that check valves according to the invention may be of arbitrary cross section or plan view. That is, they are readily adaptable to use with drains of circular cross section, as in the case of an ordinary drain pipe, or with rectangular conduit or conduit of any other shape. Embodiments of the invention adapted for use with pipes or conduits of substantially circular cross section are shown in FIGS. 4 and 8.

A further advantage of the use of check valves according to the invention is that they may be used singularly, as preferred, or in combination with other valves in any number. For example, two check valves according to the invention may be used in series, or in parallel. One particularly useful combination is shown in FIGS. 8 and 9, wherein a check valve according to the invention is housed in series with a series of side-port flapper valves 121. Side port flapper valves 121 are set in the side of housing 110 and comprise ports 122 and valve covers 123. A valve cover 123 is hinged along one edge of each of ports 122 and adapted to open under influence of liquid present in drain basin 11, as shown in FIG. 5. In preferred embodiments, valve covers 123 are fabricated from flexible elastic material such as sheet rubber (which may be either natural or synthetic, and composed of any suitable material) and are fastened or adhered along the top edge of their associated ports. As in the case of flexible diaphragms 203, valve covers 123 may be tailored by means of thickness (uniform or nonuniform) or material to open under any design hydrostatic pressure. It is advantageous, but not necessary, in making side port flapper valves to provide housing 110 with sloping sides 124, so that valve covers 123 are assisted by gravity or other body force in closing, so as to help prevent back flow of gasses from the interior of the drain conduit.

FIG. 10 is a group of various views of preferred embodiments of the invention comprising of sheath valves. All of the sheath valves of the current invention are constructed of a substantially flexible elastomeric material with memory properties such that the valve will open to allow fluid drainage and return to a collapsed and sealed position after drainage abates. Additionally, all embodiments of sheath valves of the current invention can be disposed within a drainage basin, or directly in a drain conduit.

As can be seen in FIGS. 10A–10E, all embodiments of sheath valves of the current invention have walls or flexible portions that are biased to a collapsed position such that the outlet portion of the sheath valve is sealed when there is no fluid draining through the valve. Also apparent from the figures is that the sheath valves are formed such that the collapsed portion of the sheath is biased to extend at an angle from the inlet portion of the sheath valve to further prevent any gasses or fluid backflow from entering the sheath valve.

Figure 10A:
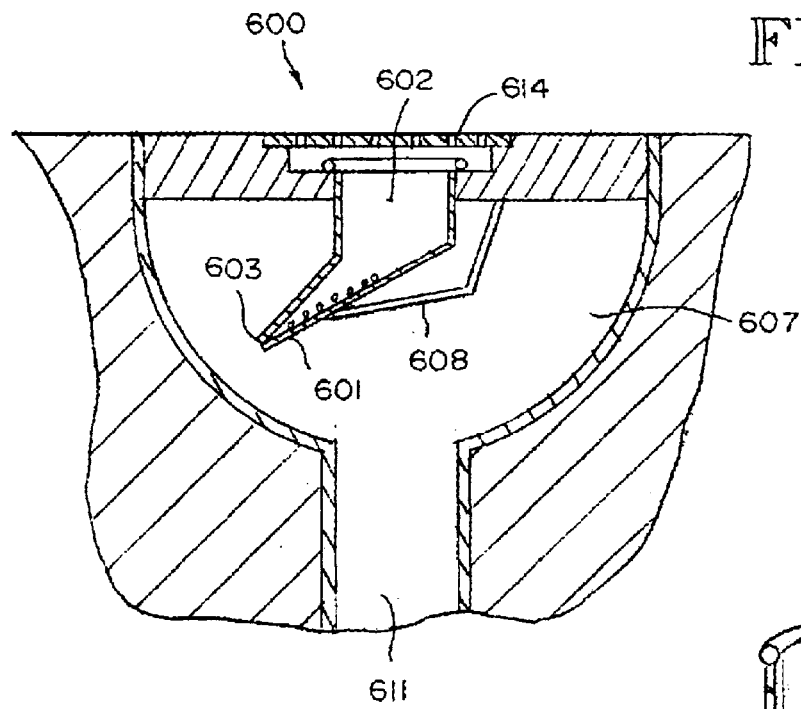
FIG. 10A is a schematic cross-sectional view of a drain assembly using another preferred embodiment of a check valve floor drain according to the invention.
Figure 10B:
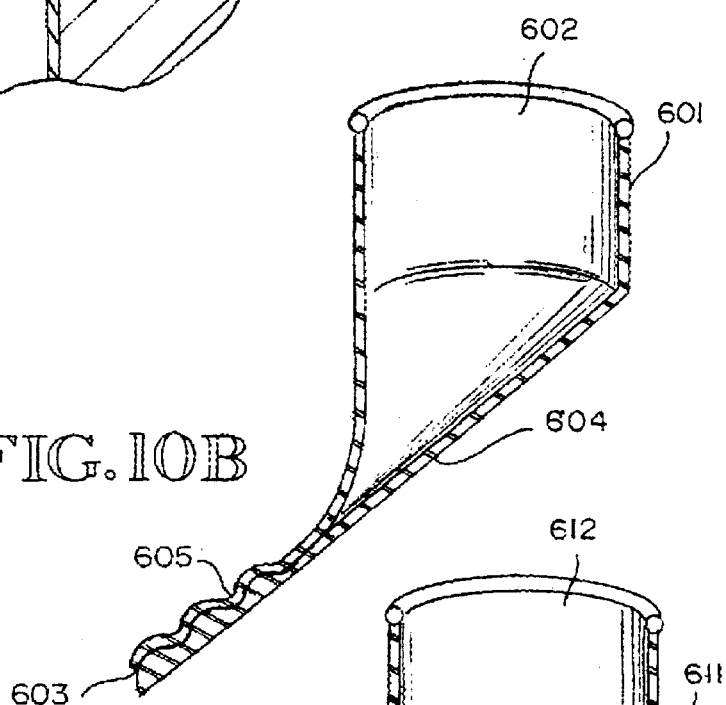
FIG. 10B is a schematic cross-sectional view of an alternative preferred embodiment of a check valve according to the invention.

In FIGS. 10A and 10B drain assembly 600 comprises drain basin 607 and collapsible sheath 601. Collapsible sheath 601 includes inlet portion 602 adapted to receive a fluid entering the drain basin and outlet portion 603. Outlet portion 603 optionally comprising at least one substantially rigid generally axially oriented longitudinal portion 604 and a generally axially oriented flexible portion 605. The rigid portion, 604 may be co-molded or otherwise integrally formed, or may be assembled of separate and distinct parts.

As can be seen in FIG. 10B, the rigid portion 604 can include a plurality of ribs to further enhance the seal. Flexible portion 605 is adapted to collapse against rigid portion 604, and thereby to prevent entry of gasses to the outlet portion when a pressure within said inlet portion is at least as great as that inside the outlet portion, and to open so as to allow passage of a fluid when the pressure within the inlet portion is greater than the pressure outside the outlet portion.

As fluid drains into the inlet portion, the sheath opens. As drainage abates, the sheath collapses and seals gasses and fluid backflow within the drain. In some instances it is advantageous to add plate 608, as shown in FIG. 10A, as it can be particularly useful in extending the service life of the valves.

Figure 10C:
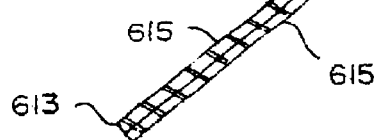
FIG. 10C is a schematic cross-sectional view of a preferred embodiment of check valve according to the invention.

FIG. 10C shows a cross section of another embodiment of the sheath valve of the current invention that does not include a rigid portion. Collapsible sheath 611 includes inlet portion 612 adapted to receive a fluid entering the drain basin and outlet portion 613. The walls 615 of the outlet portion 613 are biased to a collapsed position.

Figure 10D:
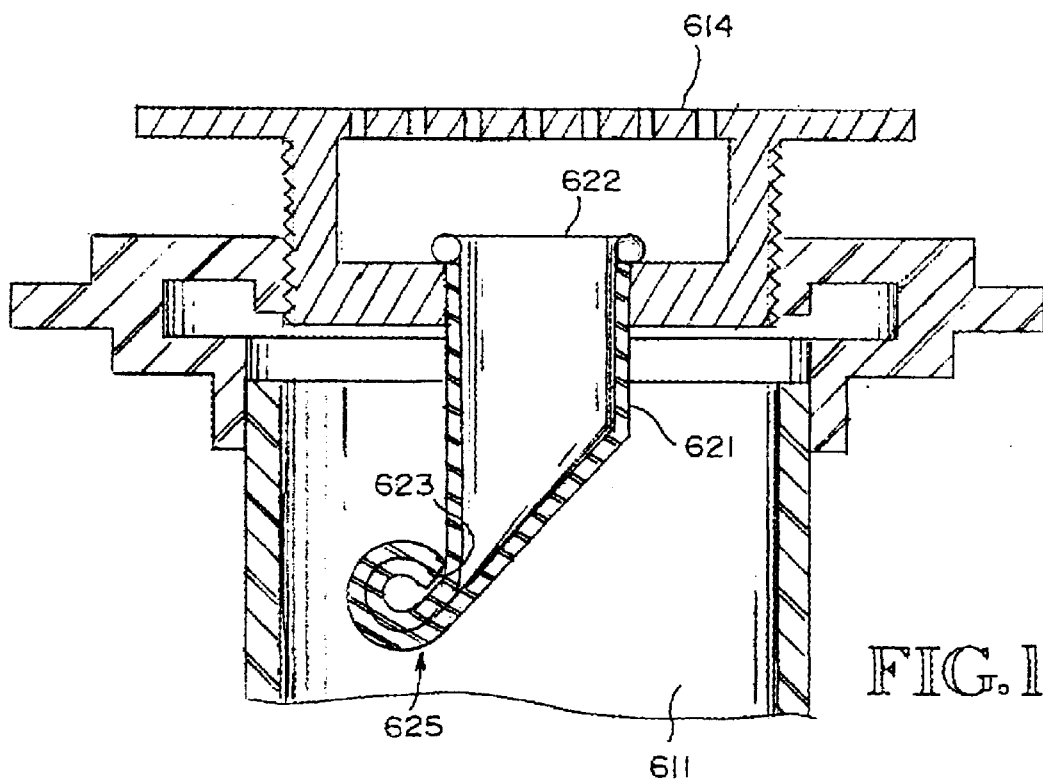
FIG. 10D is a schematic cross-sectional view of a drain assembly using yet another preferred embodiment of a check valve floor drain according to the invention, disposed in a drain conduit.

FIG. 10D shows a cross section of an alternative preferred embodiment of the sheath valve of the current invention disposed in a drain conduit. Collapsible sheath 621 includes inlet portion 622 adapted to receive a fluid entering the drain basin and outlet portion 623. In this embodiment, the walls 625 of the outlet portion 623 are biased to a collapsed position such that the outlet portion 623 is rolled upward and inward. As fluid drains into the inlet portion of the sheath, the outlet portion unrolls and opens allowing fluid to drain. As drainage abates, the sheath collapses to its original position and seals gasses and fluid backflow within the drain.

Referring to FIG. 10D fluid enters the sheath through the inlet portion 622 and causes the outlet portion 623 to unroll, open, and allow the fluid to drain. As drainage abates, the memory properties of the material cause the walls 625 to return to their collapsed position and seal gasses and fluid backflow within the drain. In some instances it may be advantageous to add plate 608, as shown in FIG. 10A.

Figure 10E:
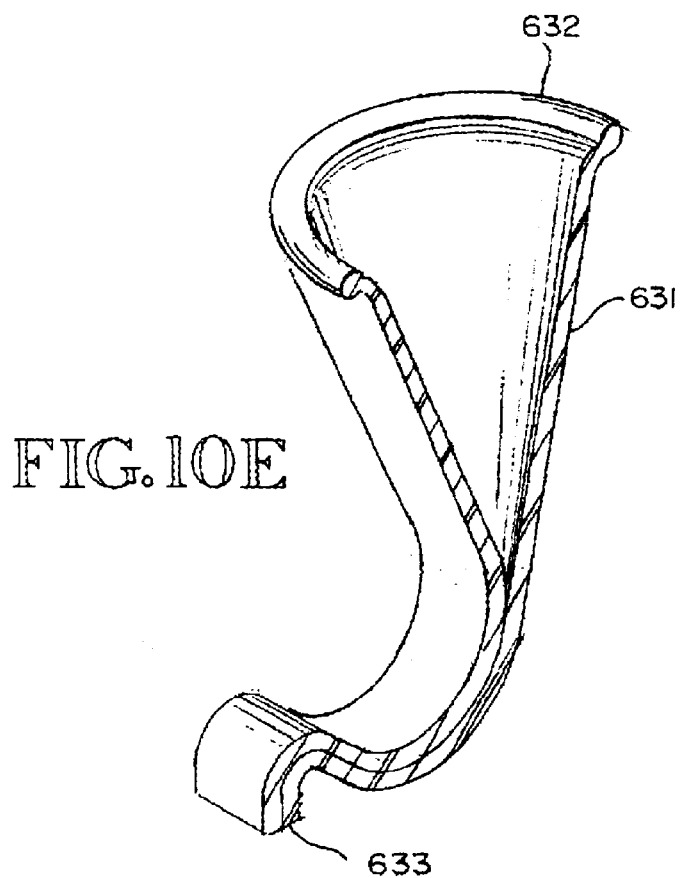
FIG. 10E is a cross-sectional view of a preferred embodiment of check valve according to the invention.

FIG. 10E shows a cross section of yet another embodiment of the sheath valve of the current invention. The valve 631 has an inlet portion 632 and an outlet portion 633. The walls of the valve are biased to a collapsed position, such that the outlet portion curves downward.

Figure 11A:
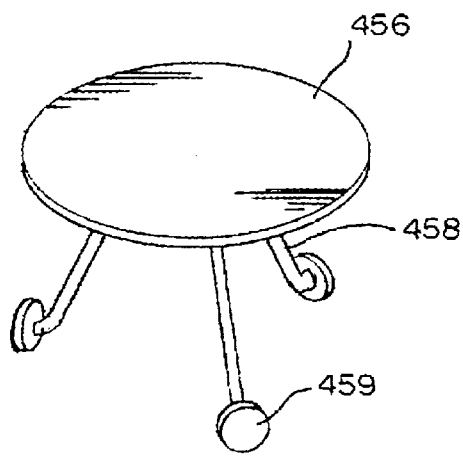
FIG. 11A is a perspective view of another preferred embodiment of the current invention.
Figure 11B:
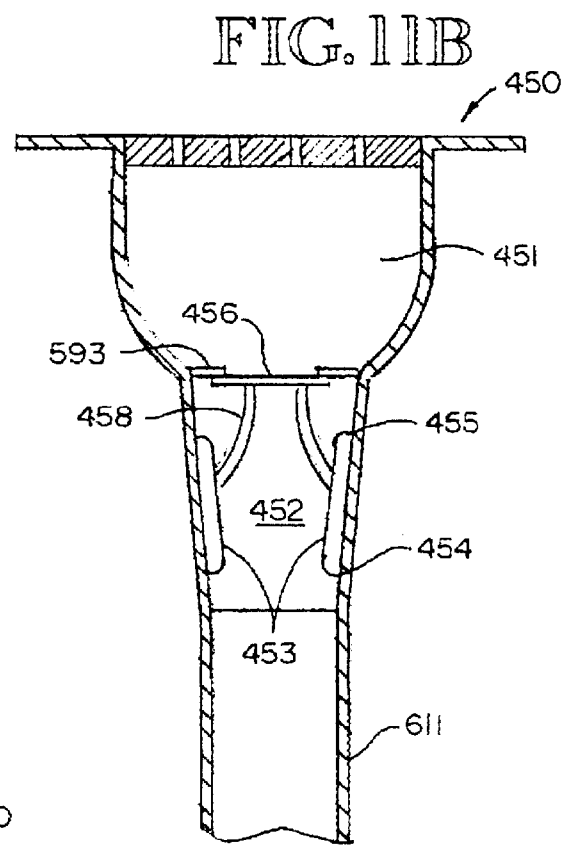
FIG. 11B is a schematic cross-sectional view of a drain assembly using another preferred embodiment of a check valve floor drain according to the invention.

In FIGS. 11A and 11B drain assembly 450 comprises drain basin 451, a plurality of vertically arranged support slides 453, and valve 456. Drain conduit 611 is attached at a lower end of the drain basin. Drain basin 451 comprises interior 452, which accommodates support slides 453 and valve 456. Support slides 453 include upper ends 455 and lower ends 454. The upper ends 455 are more remotely spaced to each other than lower ends 454. Valve 456 comprises flexible dependent struts 458, which include distal ends 459 adapted to engage support slides 453. Struts 458 are provided so that distal ends 459 are biased toward radially extended positions. Thus engagement of support slides 453 by struts 458 biases valve 456 into a closed position as shown in FIG. 11B, so that the valve seals the drain, but allows drainage when fluid is introduced above the drain. As fluid accumulates on top of the valve, the valve is forced downward, so that struts 458 are flexed into distended positions tending to resist further downward displacement of the valve. As the fluid recedes, valve 456 is allowed to return to the closed position.

Figure 12A:
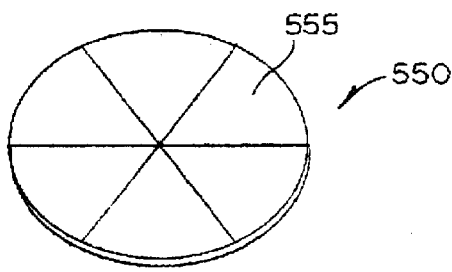
FIGS. 12A and 12B are perspective views of yet another preferred embodiment of the current invention.
Figure 12B:
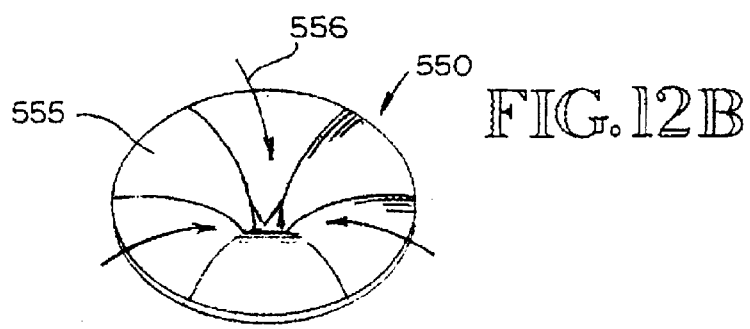

In FIGS. 12A and 12B valve 450 is adapted for placement at an opening of a drain conduit 611. Valve 450 comprises a plurality of flexible tabs 455 disposed upstream of the drain conduit and so sized and shaped as to fit together in a closed configuration in which escape of gas from said drain conduit is prevented when no fluid is present in the basin, and adapted to deflect under pressure of a fluid draining from the basin as shown by arrows 456 in FIG. 12B. Preferably, tabs 455 are biased toward the closed configuration, so the drain is closed and unwanted gasses, back flow, and the like are trapped when drainage has ceased. Preferred embodiments of this aspect of the invention further comprise a channeling device, such as a funnel-shaped basin 203 in FIG. 10 or step 593 in FIG. 11B, to channel fluid entering the drain onto the tabs and thereby increase the efficiency of drainage from the basin.

Check valves and associated components of the invention are advantageously made from any suitable materials. For example, diaphragms and stops may be fabricated from natural or synthetic rubbers, or other suitable pliant and resilient materials, including a great many polymers, while stops and housings may be made of plastics such as PVC or APP, metals, or any of a wide variety of other materials.

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made.

Industrial Applicability

The invention has applicability in the field of plumbing and liquid control or removal. In particular, the invention represents improvements in drain systems for floors and other surfaces in which infrequent drainage must be reliably and efficiently processed.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

We claim:

1. A check valve floor drain assembly for draining liquid from a draining surface into a drain conduit, the floor drain assembly comprising:
   a drain basin having a drain inlet for liquid draining from the draining surface and an outlet for attachment to the drain conduit; and
   a check valve disposed within said drain basin, said check valve adapted to permit substantially unrestricted flow of liquid from the drain inlet to the drain conduit, and to prevent backflow of gasses located within said drain conduit to said drain inlet;
   the check valve being constructed entirely from a substantially flexible elastomeric material with memory properties that allow said check valve to open for fluid passage and then return to its original shape; whereby the check valve allows liquid to drain from the draining surface and achieves a seal to prevent backflow of gases from the drain conduit after liquid has drained.

2. A drain assembly comprising:
   a check valve, said check valve comprised of a collapsible sheath valve;
   said sheath valve having an inlet portion adapted to receive a fluid entering said basin and an outlet portion, said outlet portion comprising at least one substantially rigid generally axially oriented longitudinal member and a generally axially oriented flexible portion adapted to collapse against said rigid peripheral portion, said outlet portion configured to extend downward and angle outward and thereby prevent entry of gasses to said outlet portion when a pressure within said inlet portion is not greater than a pressure outside said outlet portion, and to open so as to allow passage of a fluid when the pressure within said inlet portion is greater than the pressure outside said outlet portion;
   said sheath valve being constructed entirely from a substantially flexible elastomeric material with memory properties that allow said sheath valve to open for fluid passage and then return to its original shape;
   whereby a fluid entering said drain assembly is received by said inlet portion, said sheath valve then opens and said fluid is allowed to drain through said sheath valve, and said sheath valve closes after said fluid has passed.

3. The drain assembly of claim 2 wherein said rigid peripheral portion of said sheath valve includes a plurality of ribs running at right angles to the long axis of said rigid peripheral portion.

4. The drain assembly of claim 2 wherein said assembly is connected to a drain conduit and said sheath valve is disposed within said drain conduit.

5. The drain assembly of claim 2 further comprising a drain basin having an interior, said basin adapted for attachment of a drain conduit; and wherein said sheath valve is disposed within the interior of said drain basin.

6. The drain assembly of claim 5 further comprising a plate disposed within the interior of said basin and adapted to deflect said sheath valve.

7. A drain assembly comprising:
   a check valve, said check valve comprised of a collapsible sheath valve;
   said sheath valve having an inlet portion adapted to receive a fluid entering said basin and an outlet portion, said outlet portion comprising walls biased toward a collapsed position, said outlet portion configured to extend downward and angle outward when a pressure within said outlet portion is greater than a pressure outside said outlet portion and return to a collapsed position when a pressure within said outlet portion is no longer greater than a pressure outside said outlet portion, such configuration thereby preventing entry of gasses to said outlet portion when a pressure within said inlet portion is not greater than a pressure outside said outlet portion is prevented;
   said sheath valve being constructed entirely from a substantially flexible elastomeric material with memory properties that allow said sheath valve to open for fluid passage and then return to its original shape;
   whereby a fluid entering said drain assembly is received by said inlet portion, said sheath valve then opens and said fluid is allowed to drain through said sheath valve, and said sheath valve returns to said collapsed position after said fluid has passed thereby preventing entry of gasses to said outlet portion when a pressure within said inlet portion is not greater than a pressure outside said outlet portion.

8. The drain assembly of claim 7 wherein when said walls are biased to said collapsed position, said outlet portion is rolled upward and inward.

9. The drain assembly of claim 7 wherein when said walls are biased to said collapsed position, said outlet portion is curved downward.

10. The drain assembly of claim 7 wherein said drain assembly is connected to a drain conduit and said sheath valve is disposed within said drain conduit.

11. The drain assembly of claim 7 wherein said assembly is connected to a drain conduit and said sheath valve is disposed within said drain conduit.

12. The drain assembly of claim 7 further comprising a drain basin having an interior, said basin adapted for attachment of a drain conduit; and wherein said sheath valve is disposed within the interior of said drain basin.

13. The drain assembly of claim 10 further comprising a plate disposed within the interior of said basin and adapted to deflect said sheath outlet portion and thereby to assist biasing of said sheath walls toward said closed position.

* * * * *